United States Patent
Alexander et al.

(10) Patent No.: US 8,026,681 B2
(45) Date of Patent: Sep. 27, 2011

(54) SAFE ELECTRIC BRAKING DEVICE FOR PRINTING PRESSES AND METHOD OF ELECTRICALLY BRAKING AN ELECTRIC DRIVE IN A MACHINE PROCESSING PRINTING MATERIAL

(75) Inventors: Andreas Alexander, Leimen (DE);
Jochen Bechtler, Malsch (DE);
Wolfgang Dürr, Meckesheim (DE);
Klaus Hartmann, Schriesheim (DE);
Klaus-Dieter Kleibaumhüter, Bad Schönborn (DE); Helmut Meyer, Wiesloch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 596 days.

(21) Appl. No.: 11/963,959

(22) Filed: Dec. 24, 2007

(65) Prior Publication Data
US 2008/0150459 A1   Jun. 26, 2008

(30) Foreign Application Priority Data
Dec. 22, 2006   (DE) .................. 10 2006 061 347

(51) Int. Cl.
*H02P 3/14* (2006.01)
(52) U.S. Cl. .................. 318/376; 318/375; 318/362
(58) Field of Classification Search .................. 318/376, 318/375, 362
See application file for complete search history.

(56) References Cited

U.S. PATENT DOCUMENTS

| | | | | |
|---|---|---|---|---|
| 3,774,095 A | * | 11/1973 | Coccia | 318/371 |
| 4,761,600 A | * | 8/1988 | D'Atre et al. | 318/759 |
| 5,208,741 A | * | 5/1993 | Kumar | 363/124 |
| 5,323,095 A | * | 6/1994 | Kumar | 318/376 |
| 5,327,055 A | * | 7/1994 | Danielson et al. | 318/366 |
| 5,676,055 A | * | 10/1997 | Schwinn et al. | 101/216 |
| 6,577,483 B1 | * | 6/2003 | Steicher et al. | 361/90 |
| 6,653,806 B1 | * | 11/2003 | Ono | 318/375 |
| 7,176,653 B2 | * | 2/2007 | Jahkonen | 318/807 |
| 7,312,593 B1 | * | 12/2007 | Streicher et al. | 318/473 |

FOREIGN PATENT DOCUMENTS

| | | |
|---|---|---|
| EP | 0 726 643 A1 | 8/1996 |
| JP | 1133583 A | 5/1989 |
| JP | 2023080 A | 1/1990 |
| JP | 6315287 A | 11/1994 |
| JP | 8033195 A | 2/1996 |

OTHER PUBLICATIONS

English translation of Chinese Office Action dated Oct. 27, 2010.

* cited by examiner

*Primary Examiner* — Walter Benson
*Assistant Examiner* — David Luo
(74) *Attorney, Agent, or Firm* — Laurence A. Greenberg; Werner H. Stemer; Ralph E. Locher

(57) ABSTRACT

A method and device for electrically braking an electric drive in a machine for processing printing material, includes a power electronics connected between the electric drive and a DC voltage intermediate circuit. A further electric braking device is switchable between the electric drive and the power electronics. Upon a failure of a power system, a computer initiates a generator-type braking operation through the power electronics. The further electric braking device is switched on upon the failure of the power electronics.

12 Claims, 2 Drawing Sheets

SAFE ELECTRIC BRAKING DEVICE FOR PRINTING PRESSES AND METHOD OF ELECTRICALLY BRAKING AN ELECTRIC DRIVE IN A MACHINE PROCESSING PRINTING MATERIAL

CROSS-REFERENCE TO RELATED APPLICATION

This application claims the priority, under 35 U.S.C. §119, of German Patent Application DE 10 2006 061 347.3, filed Dec. 22, 2006; the prior application is herewith incorporated by reference in its entirety.

BACKGROUND OF THE INVENTION

Field of the Invention

The present invention relates to an electric braking device for machines for processing printing materials, including an electric drive to be braked that is supplied with electric power through a power converter during motor operation and feeds back electric power to the power converter during braking. The invention also relates to a method of electrically braking an electric drive in a machine for processing printing material.

Printing presses include one or more electric motors for driving rotary components, such as printing cylinders and transport cylinders. Due to the high masses of the cylinders, the rotating components have a relatively high lag time when the electric drive breaks down or is switched off. Since such rotary components may pose a hazard for the personnel operating a printing press, the lag time of the cylinders must be reduced to a minimum when the hazardous area is accessible. During a printing operation, the cylinders are generally safeguarded by covers, which have a sensor that senses when the cover is opened and initiates an emergency stop of the printing press to minimize the risk of injury to the operating personnel. In the case of such a shut-down, the printing press must be stopped within a predetermined, short period of time, which must not be more than a few seconds. Moreover, measures must be taken to avoid an uncontrolled state of the printing press in case of a power outage and to ensure that the press will be correctly braked to a standstill.

Such an emergency braking device for sheet-fed printing presses is known from European Patent EP 0 726 643 B1. When an emergency stop button or sensor initiates a braking of the printing press, the first step is a purely electric braking. After a predetermined, short interval, the main drive is switched to be torque-free and simultaneous mechanical braking starts. The mechanical braking is configured in such a way that it can bring the printing press to a standstill on time even in case of a failure of the electric main drive. During regular operation, the press is braked mainly electrically. Since the braking is done mechanically in case of an emergency, the mechanical brake described in European Patent EP 0 726 643 B1 must be powerful enough to make sure that the press is brought to a standstill within the short acceptable time limit. In the past few years, large sheet-fed printing presses have been developed that have great rotating masses due to their large formats. Consequently, both the electric drive motors and the mechanical brakes must be constructed to be more powerful to be able to carry out their tasks.

BRIEF SUMMARY OF THE INVENTION

It is accordingly an object of the invention to provide a safe electric braking device for printing presses, in particular for sheet-fed printing presses, and a method of electrically braking an electric drive in a machine for processing printing material, which overcome the hereinafore-mentioned disadvantages of the heretofore-known devices and methods of this general type and which only require a relatively small mechanical brake.

With the foregoing and other objects in view there is provided, in accordance with the invention, an electric braking device for machines for processing printing material. The electric braking device comprises an electric drive to be braked. A power converter supplies the electric drive with electric power in motor-type operation and receives electric power fed back from the electric drive during braking. A further braking device for consuming electric power is provided for being switched between the converter and the electric drive.

With the objects of the invention in view, there is also provided a method of electrically braking an electric drive in a machine for processing printing material. The method comprises connecting the electric drive through a power electronics to a DC voltage intermediate circuit, connecting a switchable further electric braking device between the electric drive and the power electronics, initiating, through the power electronics, a generator-type braking operation, controlled by a computer, upon a power system failure, and switching on the further electric braking device upon a failure of the power electronics.

The present invention is particularly suited for use in large-format sheet-fed printing presses. In order to drive the printing and transport cylinders, sheet-fed printing presses include at least one electric main drive that drives the cylinders, mostly through a mechanical gear train. The electric main drive is generally supplied with power through the use of a converter so that the drive can be controlled in terms of rotational speed and torque in a closed loop. The electric converter is generally connected to a direct current link or direct current intermediate voltage circuit, which is in turn connected to the public three-phase power system through a rectifier or inverter. If a state of operation requiring an immediate braking of the printing press for safety reasons occurs in the printing press, the converter reverses the flow of power in such a way that the electric drive motor no longer operates as a motor but as a generator and thus brakes the printing press to a standstill within a short period of time. The electric power that is generated in this way is fed back into the DC intermediate voltage circuit by the converter. From the DC intermediate voltage circuit, the generated energy is either fed to the public power system or converted into heat in what is known as a chopper resistor. The chopper resistor is also referred to as a main braking resistor. If the converter breaks down due to a failure, the electric braking device can no longer reliably brake the printing press down to a standstill. Therefore, it is known from the prior art to use a mechanical brake of appropriately large dimensions to brake the press in case of a failure of the electric braking device. In accordance with the present invention, such a large-dimension mechanical braking device can be dispensed with because a further braking device consuming electric power is provided. This braking device consuming electric power can be electrically connected between the converter and the electric drive motor. Moreover, the further braking device includes sensors for monitoring the braking operation of the regular electric braking device. When a failure of the regular electric braking device is detected, the further braking device automatically switches on to ensure that the printing press is securely braked to a standstill in this way. Due to the further electric braking device, a complex and large mechanical brake can be dispensed with.

In accordance with an initial embodiment of the invention, a monitoring device for monitoring the motor current of the electric drive is provided. Such a monitoring device can detect a failure of the converter because in this case there will be no more regular motor current between the electric drive and the converter. When such a motor current is detected during a generator-type braking operation, the further electric braking device is automatically switched on to ensure that the electric drive is braked down to a standstill.

In accordance with a further embodiment of the invention, the further electric braking device includes an electric braking resistor. When a failure of the regular electric braking device is detected, the further braking device consuming electric power is switched on to brake the printing press in the electric drive through the use of the electric braking resistor.

In this case, the dimensions of the electric braking resistor are chosen in such a way that timely braking is possible. Moreover, the further electric braking device advantageously includes a rectifier for converting the motor current into a DC voltage suitable for the braking resistor. In addition to the electric braking resistor, the further electric braking device may include a feed-back device for feeding power back into the power system. In this context, it is possible to feed the power to the DC voltage circuit or directly to the public power system. However, such a feeding-back of power becomes impossible if there is a power outage in the public power system. For safety reasons, an electric braking resistor must be provided for this case. The further braking device may include a plurality of braking resistors to permit gradual braking of the electric drive.

In accordance with an added embodiment of the invention, a generator-type braking operation is initiated through the power electronics, controlled by a computer, in the case of a power outage, and the further braking device is switched on upon a failure of the power electronics. In this gradual process, a power outage will initially always cause initiation of a generator-type braking operation, in which the electric power produced by the generator operation of the braked motor is used to supply power to a power supply or power supply pack and thus to the control unit of the press through the converter of the drive or an additional converter. Surplus energy is converted into heat in the main braking resistor. If, however, a failure of the power electronics, i.e. of one of the two power converters, of the single converter that is present, or of the electric control of the converter or converters is detected upon initiation of the generator-type braking operation, the further, redundant braking device is automatically switched on to ensure safe braking of the press.

Upon detection of a failure in the power electronics, the computer advantageously checks whether or not generator-type braking is possible through the use of the power electronics. In this case, a failure in the power electronics is compared with stored test diagrams to assign the failure to a critical or uncritical category. In the case of an uncritical category, a regular generator-type braking operation is initiated, because the failure evidently does not have any adverse affects on the generator-type braking operation. However, if a critical failure in the power electronics is detected, generator-type braking through the power electronics is no longer safe. Consequently, the further, redundant braking device will be switched on instead.

A particular advantage of the present invention is that, during the braking operation, above a predetermined maximum rotational speed, a mechanical brake of the drive motor is open. In this case, the mechanical brake is only used to lock the braked motor against rotation. The mechanical brake is not closed until the motor operates only at a predetermined maximum rotational speed. This maximum rotational speed is low enough so that a small mechanical braking device is sufficient to ensure safe locking of the drive motor. Moreover, the fact that the mechanical brake will only be activated below the predetermined maximum rotational speed protects the relatively small mechanic brake against overloading and damage.

In accordance with an additional embodiment of the invention, the power electronics is separated from the DC voltage intermediate circuit during braking through the further braking device. Generator-type braking through the further, redundant braking device is carried out when there is a failure in the power electronics. In order to preclude negative effects of the electric drive motor or the further electric braking device on the DC voltage intermediate circuit through the failed power electronics, the separation of the power electronics from the DC voltage intermediate circuit is carried out in the case of a failure.

In order to meet current safety requirements, a braking of the electric drive motor to a standstill must be possible within not more than 10 seconds. Consequently, the further electric braking device and the regular generator-type braking operation must be selected in such a way that this predetermined time period is not exceeded.

Other features which are considered as characteristic for the invention are set forth in the appended claims.

Although the invention is illustrated and described herein as embodied in a safe electric braking device for printing presses and a method of electrically braking an electric drive in a machine for processing printing material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
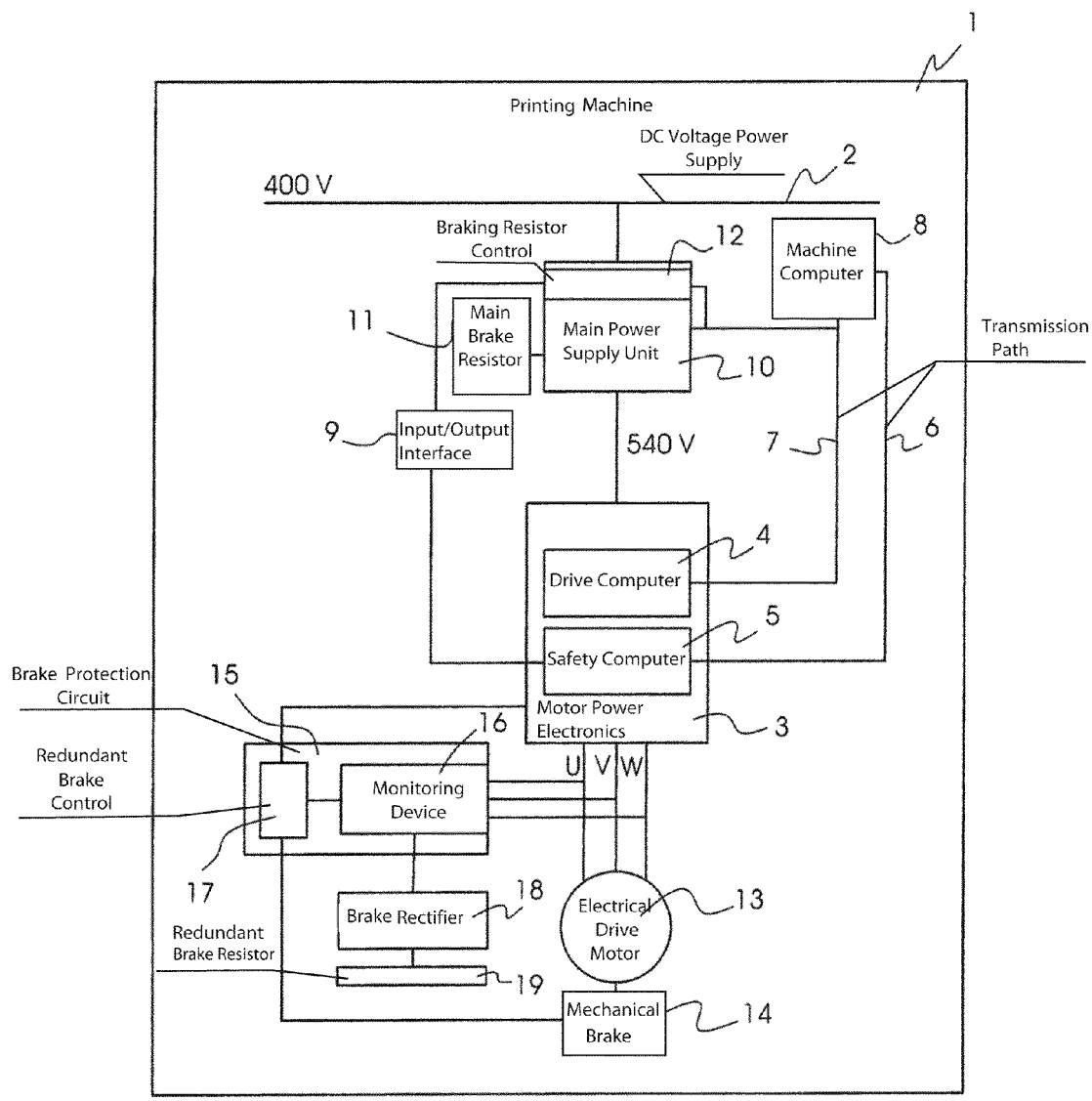
FIG. 1 is a block diagram of an electric braking circuit according to the invention in a printing press.

Referring now to the figures of the drawings in detail and first, particularly, to FIG. 1 thereof, there is seen a printing press 1 including at least one electric drive motor 13. This electric drive motor or drive 13 may be constructed as a main drive and may drive all of the cylinders in the printing press 1 through a gear train. In large-format printing presses, the drive motor 13 may have an electric wattage of more than 100 KW because it needs to rotate huge masses due to the large cylinders. The electric drive motor 13 has a three-phase connection U, V, W to a motor power electronics 3. This motor power electronics 3 includes a drive computer 4 and a safety computer 5, both of which may have a fundamentally identical construction. During normal operation, the drive computer 4 controls the motor power electronics 3 and a converter included in the motor power electronics 3, in order to adjust the electric drive motor 13 to a respective operating condition of the printing press 1. The motor power electronics 3 is supplied with a 540 Volt DC voltage through a supply unit 10. The supply unit 10 includes a power converter that converts the 400 Volt system voltage into a 540 Volt DC voltage of a DC voltage supply level 2. The supply unit 10 additionally includes a braking resistor control 12 for controlling or activating a main braking resistor or chopper resistor 11. Moreover, a press computer 8 is provided, which controls the motor power electronics 3 through two separate CAN buses 6, 7, for example. One of the CAN buses is constructed as a safety path 6, whereas the other CAN bus is an operating path 7. Thus, it is not only the drive computers 4, 5 that are constructed to be redundant, but also the transmission paths 6, 7 to the machine computer 8, because both always process the same data in parallel. The machine computer 8 is the central control device of the press 1 and calculates the required nominal values of the individual drive components for the respective operating condition.

A safety input and output interface 9 is provided for the purpose of exchanging safety-relevant control signals. It may be used to exchange signals indicating correct operation of a component such as the power supply unit 10. In this manner, a power outage, for example, signaled by the main power supply unit 10, is transmitted to the computer 4, 5. For this purpose, the input voltage is continuously monitored in the main power supply unit 10. If the input voltage drops below a critical value, it may be safely assumed that there is a system outage, and a corresponding signal is sent to the computers 4 and 5 through the input and output interface 9. Thus, if a power system outage time t is more than 5 msec (t>5 msec), an automatic braking operation is initiated in the press. In this case, the computers 4, 5 switch the electric drive motor 13 from motor-type operation to generator-type operation and thus brake the rotating cylinders of the printing press 1. The electric power generated in this way is used to supply power to a power supply or power supply pack and to the machine control through the converter of the drive or an additional converter. In the main braking resistor, surplus energy is converted into heat. A mechanical locking brake 14 does not act until the electric drive motor 13 has been braked almost to a standstill. Then it secures the electric drive motor 13 against rotation.

The converter in the power electronics 3 may not function correctly due to technical failures in the power electronics 3, which means that a regular generator-type braking operation through the main braking resistor 11 becomes impossible. In this case, the press 1 can no longer be braked by the main braking resistor 11. If the computers 4, 5 detect such a failure in the power electronics 3, they will firstly check whether or not the detected failure affects a generator-type braking operation through the main braking resistor 11. If this is not the case, a regular generator-type braking operation is carried out. If the detected failure may cause problems for a generator-type braking operation through the use of the main braking resistor 11, a redundant brake control 17, which includes a further electric braking device, is activated. The redundant brake control 17 includes a brake protection circuit or further braking device 15 and a brake rectifier 18. A monitoring device 16 for monitoring the motor current of the electric motor 13 is also provided. The brake protection circuit 15 ensures that the mechanical brake 14 remains open and thus protects the mechanical brake 14 against overloading. The redundant brake control 17 feeds the electric power coming from the drive motor 13, which operates as a generator, through the brake rectifier 18, to a redundant brake resistor 19. For safety reasons, the dimensions of this redundant brake resistor 19 must be selected to be at least similar to those of the main brake resistor 11. Before an emergency braking is carried out through the further electric braking device, the computers 4, 5 disconnect the power electronics 3 from the power system and block output transistors. Then the emergency braking operation is carried out through the use of the brake rectifier 18 and the redundant brake resistor 19. As soon as the brake protection circuit 15 has detected an uncritical rotational speed of the drive motor 13, the mechanical brake 14 is closed to securely lock the electric drive motor 13. The rotational speed for the closing of the mechanical locking brake 14 must be low enough to prevent the residual braking power to be absorbed from exceeding the power of the mechanical brake 14.

Figure 2A:
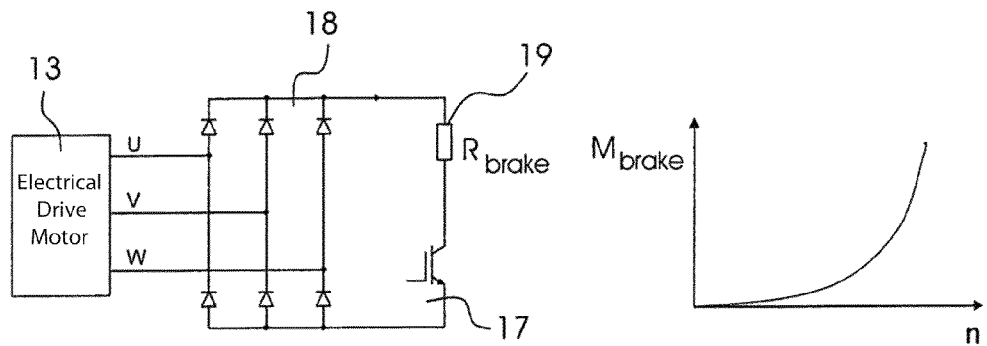
FIG. 2a includes a schematic circuit diagram of a redundant braking device with a braking resistor and a graph of braking torque as a function of rotational speed.
Figure 2B:
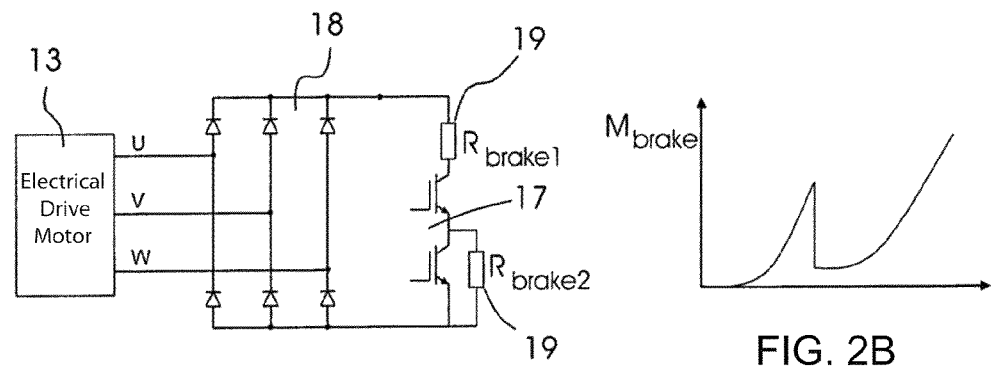
FIG. 2b includes a schematic circuit diagram of a redundant braking device with two-stage switchable braking resistors and a graph of braking torque as a function of rotational speed.
Figure 2C:
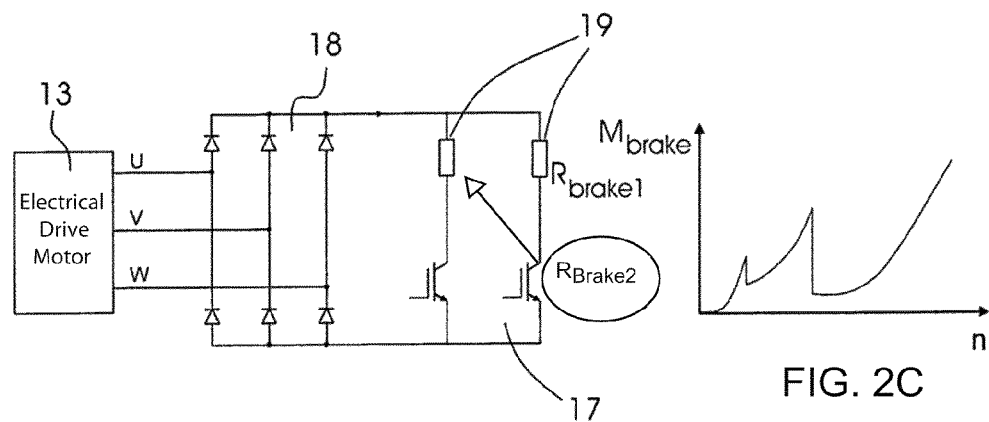
FIG. 2c includes a schematic circuit diagram of a redundant braking device with three-stage switchable braking resistors and a graph of braking torque as a function of rotational speed.

FIGS. 2a, 2b and 2c illustrate different embodiments of the redundant electric braking device 17. In addition to the respective circuit, the braking torque is shown as a function of the rotational speed of the electric drive motor 13. It is apparent that the electric drive motor is braked to a standstill in all three cases. In FIG. 2a, the further or redundant electric braking device 17 includes only one braking resistor 19, designated $R_{brake}$. The further or redundant electric braking device 17 may connect the braking resistor 19 through the use of a thyristor or IGBT. Once the braking resistor 19 has been connected, electric braking to a standstill is carried out.

In the embodiment of FIG. 2b, two redundant braking resistors 19 are provided, which are designated $R_{brake1}$ and $R_{brake2}$. In this case, a two-stage cascade braking operation is possible. For this purpose, the two braking resistors $R_{brake1}$ and $R_{brake2}$ are activatable through the use of two thyristors or IGBTs of the redundant brake control or braking device 17. At first, the braking resistor $R_{brake1}$ is used to achieve the desired braking effect. Once the rotational speed drops below a predetermined value, the thyristor or IGBT that is parallel to the second braking resistor $R_{brake2}$ is activated to switch on the second braking resistor $R_{brake2}$. Below this rotational speed, the two braking resistors 19 carry out a generator-type braking operation, the braking torque is increased once more, and the electric drive motor 13 is braked to a standstill.

In accordance with the embodiment shown in FIG. 2c, a three-stage braking operation of the electric drive motor 13 is carried out through two braking resistors 19, designated $R_{brake1}$ and $R_{brake2}$, which are switchable in parallel. Both braking resistors $R_{brake1}$, $R_{brake2}$ can be switched on and off through the use of two IGBTs or thyristors of the redundant brake control 17. Initially, the associated IGBTs or thyristors are switched on for both braking resistors 19 to cause a braking of the electric drive motor 13. Once the rotational speed drops below a first predetermined value, the larger braking resistor $R_{brake1}$ is switched off and the second, smaller braking resistor $R_{brake2}$ remains switched on and connected. Consequently, the electric drive motor 13 is braked more strongly in the second phase. Once a second predetermined rotational speed is reached, the larger one of the two braking resistors 19, $R_{brake2}$, is connected, the braking resistor $R_{brake1}$ is switched off through the associated thyristor or IGBT of the redundant braking control 17, and an even stronger braking to a standstill is carried out by increasing the braking torque.

The invention claimed is:

1. An electric braking device for machines processing printing material, the electric braking device comprising:
   an electric drive to be braked;
   a power converter supplying said electric drive with electric power in motor-type operation and receiving electric power fed back from said electric drive during braking, said power converter having a main braking resistor for braking said electric drive; and
   a further braking device for consuming electric power and for being switched between said converter and said electric drive, said further braking device including a brake rectifier and an electric brake resistor;
   a computer for controlling the further braking device upon a power system failure.

2. The electric braking device according to claim 1, which further comprises a monitoring device for monitoring a motor current of said electric drive.

3. The electric braking device according to claim 1, which further comprises a mechanical locking brake for locking said electric drive.

4. The electric braking device according to claim 1, wherein said further braking device includes a plurality of braking resistors.

5. The electric braking device according to claim 1, wherein said further braking device is an electric braking device.

6. A method of electrically braking an electric drive in a machine processing printing material, the method comprising the following steps:
   connecting the electric drive through a power electronics to a DC voltage intermediate circuit, the power electronics having a main braking resistor;
   connecting a switchable further electric braking device between the electric drive and the power electronics, the further electric braking device having a brake rectifier and an electric brake resistor;
   initiating, through the power electronics, a generator-type braking operation, controlled by a computer, for braking the electric drive with the main braking resistor upon requiring an immediate braking of the machine for safety reasons; and
   switching on the further electric braking device upon a failure of the power electronics for braking the electric drive with the electric brake resistor.

7. The method according to claim 6, which further comprises checking, with the computer, if generator-type braking by the power electronics is possible, upon the detection of a failure in the power electronics.

8. The method according to claim 6, which further comprises opening a mechanical brake of the electric drive during the braking operation above a predetermined maximum rotational speed.

9. The method according to claim 6, which further comprises disconnecting the power electronics from the DC voltage intermediate circuit during braking by the further braking device.

10. The method according to claim 6, which further comprises braking the electric drive to a standstill within a period of time of less than 10 seconds.

11. The method according to claim 6, which further comprises converting braking energy into heat in a chopper resistor during generator-type braking by the power electronics.

12. The method according to claim 6, which further comprises feeding electric braking energy back into a DC voltage level during generator-type braking by the power electronics.

* * * * *